United States Patent
Rached et al.

(10) Patent No.: US 6,904,107 B1
(45) Date of Patent: Jun. 7, 2005

(54) SPACE-WEIGHTED COMMUNICATION PATH ESTIMATION

(75) Inventors: Nidham Ben Rached, Paris (FR); Jean-Louis Dornstetter, Plaisir (FR)

(73) Assignee: Nortel Matra Cellular, Guyancourt Cedex (FR)

( * ) Notice: Subject to any disclaimer, the term of this patent is extended or adjusted under 35 U.S.C. 154(b) by 0 days.

(21) Appl. No.: 09/402,955

(22) PCT Filed: Apr. 10, 1998

(86) PCT No.: PCT/FR98/00735

§ 371 (c)(1),
(2), (4) Date: Feb. 14, 2000

(87) PCT Pub. No.: WO98/47240

PCT Pub. Date: Oct. 22, 1998

(30) Foreign Application Priority Data

Apr. 14, 1997 (FR) .............................. 97 04653

(51) Int. Cl.[7] .............................. H03D 1/00; H04L 27/06
(52) U.S. Cl. .................. 375/343; 375/142; 375/143; 375/150; 375/151
(58) Field of Search ............................... 375/343, 326, 375/148, 211, 347, 130, 231, 142, 341

(56) References Cited

U.S. PATENT DOCUMENTS

| 5,432,816 A | * | 7/1995 | Gozzo ........................ 363/131 |
| 5,761,088 A | * | 6/1998 | Hulyalkar et al. .......... 348/611 |
| 5,917,851 A | * | 6/1999 | Jarvela et al. .............. 375/148 |
| 6,097,770 A | * | 8/2000 | Bahai et al. ................. 375/343 |

OTHER PUBLICATIONS

Khalaj, "2D RAKE Receivers for CDMA Cellular Systems", 0–7803–1820–X/94, 1994, pp 400–404.

* cited by examiner

*Primary Examiner*—Stephen Chin
*Assistant Examiner*—Curtis Odom
(74) *Attorney, Agent, or Firm*—Barnes & Thornburg

(57) ABSTRACT

A method of estimating a communication path formed of a plurality of channels, the method necessitating an estimate of the impulse response $C_1, C_2, \ldots, C_n$ of the channels, including the following steps of (1) acquiring a space statistic of the transmission path, and (2) establishing a corrected impulse response $(C_1, C_2, \ldots, C_n)$ at least by weighting the impulse responce estimates $(C_1, C_2, \ldots, C_n)$ by the space statistic and an estimate of the additive noise $(N_{01}, N_{02}, \ldots, N_{0n})$ of the channels.

14 Claims, 3 Drawing Sheets

SPACE-WEIGHTED COMMUNICATION PATH ESTIMATION

RELATED APPLICATION

This application is the national filing of international application number PCT/FR98/00735.

BACKGROUND OF TH INVENTION

The present invention relates to a method of estimating a communication path formed by a plurality of channels. Thus it relates to a technique referred to as reception diversity, whereby a receiver has a plurality of antennas each associated with a different communication channel. In other words, the invention proposes a method of estimating the impulse responses of the transmission channels.

In a communications system, especially a radio communications system, the receiver receives for each communication channel a signal transmitted by a transmitter. The transmitted signal is subject to amplitude and phase fluctuations in the communication channel with the result that the signal received by the receiver is not identical to the transmitted signal. Signal fluctuations are essentially due to what the skilled person refers to as intersymbol interference. This interference can result from the modulation law employed for transmission and is also caused by multipath propagation in the channel.

It is found that the received signal is generally the result of a large number of reflections in the channel. The various paths taken by the transmitted signal cause various delays at the receiver. The impulse response of the channel represents all such fluctuations affecting the transmitted signal. It is therefore the fundamental characteristic representative of transmission between the transmitter and the receiver.

The impulse response of the channel is used in particular by an equalizer whose precise function is to correct intersymbol interference in the receiver. A standard method of estimating the impulse response consists in placing a training sequence made up of known symbols in the transmitted signal.

The sequence is chosen as a function of the modulation law and the dispersion of the channel. In the present context, "dispersion" is to be understood as meaning the delay affecting a transmitted symbol taking the longest path of the channel relative to the same symbol taking the shortest path. The dispersion is routinely expressed as a multiple of the time between two successive transmitted symbols, i.e. a number of "symbol periods".

Two examples of prior art techniques for estimating the impulse response of a communication channel are mentioned.

The first technique uses particular training sequences referred to as constant amplitude zero autocorrelation (CAZAC) sequences. These sequences are described in an article by A. MILEWSKI: "Periodic sequences with optimal properties for channel estimation and fast start-up equalization", IBM Journal of Research and Development, Vol.27, No.5, Sept. 83, pages 426–431.

The GSM cellular mobile radio system uses training sequences TS made up of 26 symbols $a_0$ to $a_{25}$ taking the value +1 or −1. These sequences have the following properties:

$$\sum_{i=5}^{20} a_i^2 = 16$$

$$\sum_{i=5}^{20} a_i a_{i+k} = 0 \text{ if } 0 < |k| \le 5$$

Letting d denote the dispersion of the channel, which takes the value 4 in GSM, the estimate of the impulse response takes the form of a vector X with five components $x_0$ to $x_4$.

The received symbol sequence S corresponding to the training sequence TS is also made up of 26 symbols, denoted $s_0$ to $s_{25}$. The natural assumption is made here that the transmitter and the receiver are perfectly synchronized, in which case the estimate of the impulse response X is given by the following expression:

$$X_k = \frac{1}{16} \sum_{i=5}^{20} a_i s_{i+k} \text{ for } 0 \le k \le 4$$

The CAZAC technique has the advantage that it is very simple to implement. However, it should be noted that each component of the impulse response is established from only 16 received symbols. Because the training sequence is made up of 26 symbols and the channel dispersion value is 4, there is information in the received signal that is not taken into account and this degrades performance compared to the theoretical ideal.

The second prior art technique uses the least squares criterion. It is described in particular in patent applications FR 2 696 604 and EP 0 564 849. It uses a measurement matrix A constructed from a training sequence TS of length n. The matrix has (n−d) rows and (d+1) columns, where d again represents the dispersion of the channel. The item in the ith row and the jth column is the (d+i−j)th symbol of the training sequence:

$$A = \begin{pmatrix} a_4 & a_3 & a_2 & a_1 & a_0 \\ a_5 & a_4 & a_3 & a_2 & a_1 \\ a_6 & a_5 & a_4 & a_3 & a_2 \\ a_7 & \cdots & \cdots & \cdots & \cdots \\ \cdots & \cdots & \cdots & \cdots & \cdots \\ \cdots & \cdots & \cdots & \cdots & \cdots \\ a_{25} & \cdots & \cdots & \cdots & a_{21} \end{pmatrix}$$

The training sequence is chosen so that the matrix $A^t A$, where the operator $.^t$ represents transposition, cannot be inverted. This is inherently the case for CAZAC sequences but is also the case for other sequences.

The first four symbols $s_0$ through $s_3$ in the sequence of received symbols are ignored because they also depend on unknown symbols transmitted before the training sequence, given that the value of the channel dispersion is 4. At the risk of using a misnomer, the received signal will therefore be defined as a vector S whose components are the received symbols $s_4, s_5, s_6, \ldots s_{25}$.

The estimate of the impulse response then takes the following form:

$$X = (A^t A)^{-1} A^t . S$$

This least squares technique is slightly more complex than the preceding technique but it should be noted that the matrix $(A^t A)^{-1} A^t$ is calculated only once. Note also that each component of the estimate of the impulse response X is obtained from 22 received symbols, rather than 16 as in the CAZAC technique. Improved performance can therefore be expected.

However, regardless of the technique used, the impulse response of each channel of the communication path is considered to be independent of the others.

A first object of the present invention is therefore to provide a method of estimating a communication path which takes into account the fact that the various antennas are spatially linked.

SUMMARY OF THE INVENTION

The method in accordance with the invention of estimating a communication path is used when the path is formed of a plurality of channels and the method necessitates an estimate of the impulse responses $C_1, C_2, \ldots, C_n$ of said channels. The method includes the following steps:

acquiring a space statistic of the transmission path, establishing a corrected impulse response at least by weighting said impulse response estimates by means of said space statistic and an estimate of the additive noise of said channels.

The space statistic advantageously corresponds to an estimate of the correlation of the communication channels taken two by two.

In a preferred embodiment of the invention the estimate of the correlation of the communication channels takes the form of a space correlation matrix in which the element in the ith row and the jth column is obtained by smoothing the product of the Hermitian transposition of the estimated impulse response of the ith channel and the estimated impulse response of the jth channel.

According to an additional feature of the invention a signal S received by a channel corresponds to a transmitted training sequence and the estimate of the additive noise $N_{01}$ of that channel is obtained by normalizing the energy of the vector $(S-AC_1)$ where A is the measurement matrix associated with said training sequence.

The normalization can followed by an averaging step.

Also, if a noise matrix N is formed from the estimated additive noise $N_{01}, N_{02}, \ldots, N_{0n}$ of the channels and a space-weighting matrix G' is defined on the basis of said spatial correlation matrix G and said noise matrix $G'=G(G+N)^{-1}$, said corrected impulse responses $C'_1, C'_2, \ldots, C'_n$ are obtained from the following expression:

$$\begin{pmatrix} C''_1 \\ C''_2 \\ \vdots \\ C''_n \end{pmatrix} = G' \begin{pmatrix} C'_1 \\ C'_2 \\ \vdots \\ C'_n \end{pmatrix}$$

The method of estimating a communication path is therefore based on the estimate of the impulse response of the various channels considered as independent channels. Estimation errors are inevitable. As a general rule, determining the impulse response of a single communication channel is a problem that cannot be solved exactly in the presence of additive noise. Also, the prior art techniques implicitly assume that the impulse response can take any form.

Accordingly, a second object of the invention is to provide a method of estimating the impulse response of a communication channel which has improved response to additive noise, in other words which leads to an error lower than the estimation error of prior art techniques. This method is advantageously applied to at least one of the channels forming the communication path before establishing impulse responses corrected by weighting by means of the space statistic and an estimate of the additive noise of the channels.

According to the invention, this method requires a signal received by a channel and corresponding to a transmitted training sequence. The method includes the following steps:

acquiring a time statistic of the transmission channel, establishing the estimate of the impulse response of said channel, which estimate is weighted by said time statistic of the channel by means of said received signal.

The time statistic of the channel represents a value of the impulse response prior to acquisition of the received signal. Said weighting introduces the fact that the impulse response related to the received signal has a value which is probably closer to that prior value than a value very far away from it. Thus the estimation error is reduced from the statistical point of view.

The time statistic advantageously corresponds to an estimate of the covariance of said impulse response.

A first variant of the method includes the following steps:

smoothing said impulse response and orthonormalizing by means of a transformation matrix W to obtain said estimate of the covariance which then takes the form of a matrix L', seeking eigenvectors $v_i'$ and eigenvalues $\lambda_i'$ associated with that matrix L', estimating the instantaneous impulse response of the channel from said received signal and applying that transformation matrix W to form a vector X', so establishing said weighted estimate Xp:

$$X_p = \sum \left( \frac{\lambda_i' - N_0}{\lambda_i'} (v_i'^h \cdot X') \right) W v_i'^h$$

where $N_0$ is a positive real number representing the additive-noise of said channel.

The additive noise can be made equal to the smallest of said eigenvalues $\lambda_i'$.

Each eigenvalue of a subset of said eigenvalues $\lambda_i'$ having a contribution less than a predetermined threshold can be forced to the value of said additive noise.

This reduces the complexity commensurately.

In a second variant of the method the estimate of the covariance takes the form of a matrix R and said weighted estimate is established as follows:

$$Xp = (A^t A + N_0 R^{-1})^{-1} A^t.S$$

where A is the measurement matrix associated with said training sequence and $N_0$ is a positive real number representing the additive noise of said channel.

The method can include a step of orthonormalizing said matrix R by means of a transformation matrix W to obtain a new matrix R', the weighted estimate then taking the following new form:

$$Xp = W^t (I + N_0 R^{-1})^{-1} W^t A'^t.S$$

where the matrix A' is equal to product of the transformation matrix W and said measurement matrix A.

The expression $(I+N_0 R'^{-1})^{-1}$ is advantageously calculated by means of the matrix inversion lemma.

BRIEF DESCRIPTION OF THE DRAWINGS

The present invention will emerge in more detail from the following description of embodiments of the invention which is given by way of example only and with reference to the accompanying drawings, in which.

DESCRIPTION OF THE PREFERRED EMBODIMENTS

The invention is described as applied to GSM, because GSM has the merit of being well-known to the skilled person. Thus GSM is described in the interests of clarity, but this must not be taken as limiting the invention to this system alone.

Figure 1:
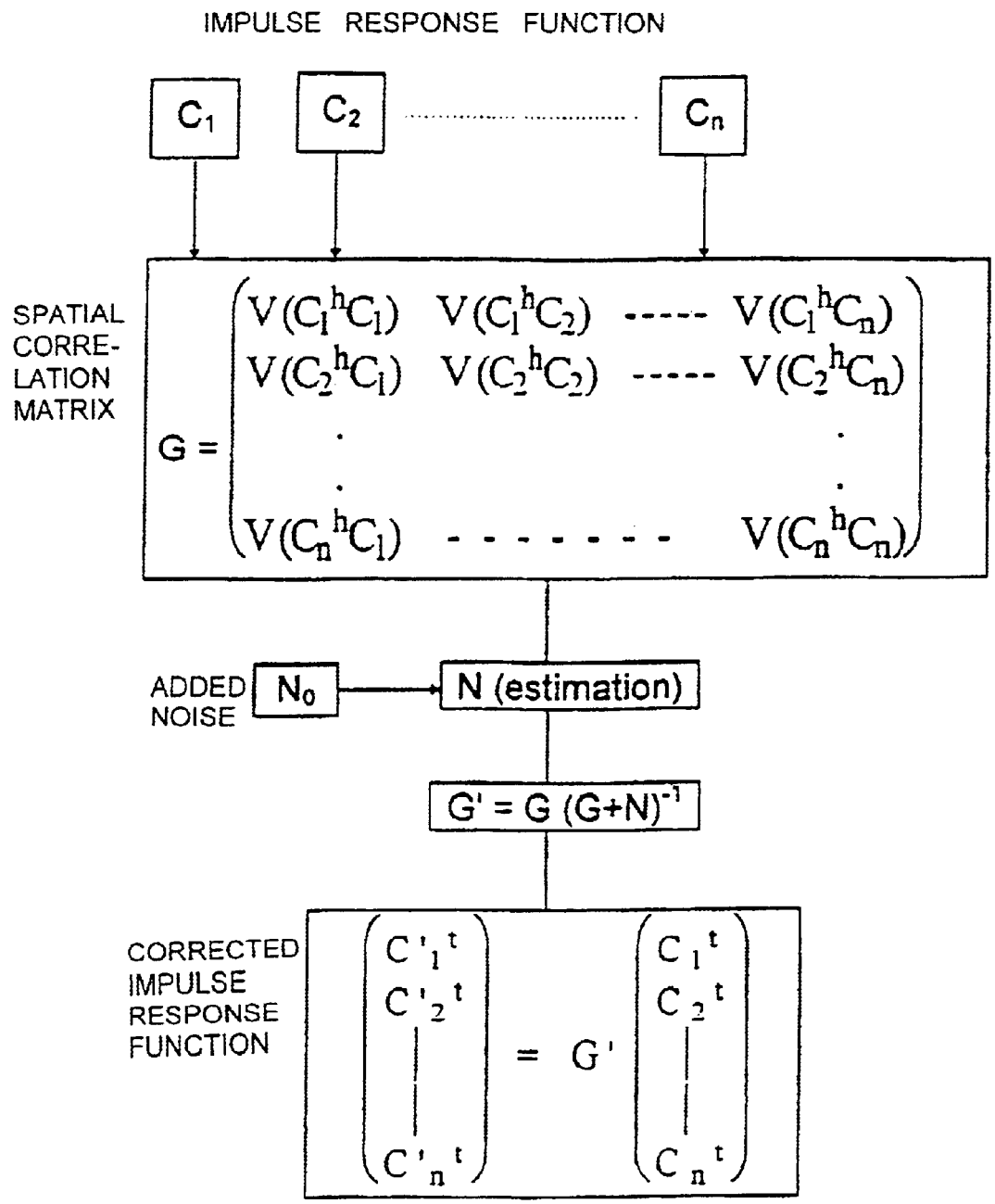
FIG. 1 is a diagram identifying the principal steps of an implementation of a method of the invention for estimating a communication path.

Referring to FIG. 1, the method of estimating a communication path is applied when the path includes at least two communication channels, generally n channels. Each channel corresponds to a separate antenna. It is assumed that an estimate of the respective impulse responses $C_1, C_2, \ldots, C_n$ of each of the channels has been arrived at using any of the available techniques.

The method first acquires a space statistic of the communication path. The expression "space statistic" refers to a set of data reflecting the behavior of the path over a predetermined period referred to as the correlation period. Because the various antennas are fixed, the signals received at the antennas have some degree of correlation. The invention aims specifically to exploit this fact to improve the quality of the estimate of the impulse response of at least one channel. For example, this statistic can be obtained by means of a spatial correlation matrix G:

$$G = \begin{pmatrix} V(C_1^h C_1) & V(C_1^h C_2) & \cdots & V(C_1^h C_n) \\ V(C_2^h C_1) & V(C_2^h C_2) & \cdots & V(C_2^h C_n) \\ \cdots & \cdots & \cdots & \cdots \\ \cdots & \cdots & \cdots & \cdots \\ \cdots & \cdots & \cdots & \cdots \\ V(C_n^h C_1) & V(C_n^h C_2) & \cdots & V(C_n^h C_n) \end{pmatrix}$$

where the operator $.^h$ represents the Hermitian transposition.

The square matrix G with dimensions (n,n) can therefore be represented generically by the element $g_{ij}$ in the ith row and the jth column:

$$G_{ig} = V(C_i^h C_j)$$

The element $g_{ij}$ is obtained by smoothing the product $C_i^h C_j$ using the estimated impulse responses $C_i, C_j$ of the ith and jth channels obtained during the correlation period. This smoothing is an estimate of the correlation of the two channels.

Here "smoothing" is to be understood in a very general sense, meaning any operation for smoothing or averaging the product $C_i^h C_j$ over the correlation period.

A first example of smoothing consists in averaging the product over the correlation period:

$$V(C_i^h C_j) = \frac{1}{e} \sum_{1}^{e} c_i^h c_j$$

The correlation period is assumed to include e successive estimates of each of the impulse responses $C_1, C_2, \ldots, C_n$.

A second example of smoothing consists in updating, at the pth estimate received for each of the ith and jth channels, the smoothing expression $V_{p-1}(C_i^h C_j)$ obtained at the (p−1)th estimation by means of a multiplier coefficient α which has a value from 0 to 1 and is often referred to as the smoothing forget factor:

$$V_p(C_i^h C_j) = \alpha C_i^h C_j + (1-\alpha) V_{p-1}(C_i^h C_j)$$

Initialization can be effected by any means, in particular using the first estimate obtained or an average for the first estimates received obtained as in the first example.

The estimation method then proposes to estimate the additive noise $N_{01}, N_{02}, \ldots, N_{0n}$ Non present in each of the channels by means of the estimates of the respective impulse responses $C_1, C_2, \ldots, C_n$ of the channels.

Various solutions for obtaining this estimate of the noise are proposed and the case of a single channel, for example the first channel, is discussed, given that the same solutions apply to each channel.

A simple solution assigns $N_{01}$ a predetermined value which reflects a threshold below which it is considered to be unlikely that the additive noise can descend. This value can be determined by measuring a signal to noise ratio or from the performance of the receiver, for example.

Also, the noise $N_{01}$ can be estimated by means of the estimate of the impulse response $C_1$ of the first channel and the corresponding received signal S. Thus the noise can be estimated before applying the space-weighted estimation method, regardless of which technique is used. Nevertheless, if this were not the case, there is proposed here a method which is appropriate if the estimate of the impulse response $C_1$ is acquired using the least squares technique.

It is therefore a matter of estimating the additive noise directly from the received signal S and the measurement matrix A. Letting $N_1$ denote the noise vector affecting the received signal:

$$S = AC_1 + N_1$$

The estimate of the noise $N_{01}$ takes the form:

$$N_{01} = \left(\frac{1}{22}\right)(S - AC_1)^h(S - AC_1)$$

because the vectors S and $N_1$ have 22 components.

This estimate of the additive noise $N_{01}$ can naturally be averaged or smoothed.

A noise matrix N in which $n_{ij}$ denotes the element in the ith row and the jth column is constructed from the estimates of the additive noise $N_{01}, N_2, \ldots, N_{0n}$ of the various channels.

If i is equal to i, the element $n_{ij}$ takes the value of the estimated noise $N_{0i}$.

If i and i are different, the element $n_{ij}$ is a null element.

Also, and again in the interests of simplification, it is possible to calculate the average value $N_0$ of the estimated noise $N_{01}, N_{02}, \ldots, N_{0n}$ and to force each element $n_{ij}$ on the diagonal of the matrix N to that average value $N_0$. Letting I denote the identity matrix, it follows that the noise matrix N takes the following form:

$$N = N_0 I$$

The correlation matrix G and the noise matrix N are used to define a new matrix, namely the space weighting matrix G':

$$G' = G(G+N)^{-1}$$

The impulse responses $C'_1, C'_2, \ldots, C'_n$ corrected by means of the space weighting matrix G' are therefore defined as follows:

$$\begin{pmatrix} C_1^{\prime t} \\ C_2^{\prime t} \\ \vdots \\ C_n^{\prime t} \end{pmatrix} = G' \begin{pmatrix} C_1^t \\ C_2^t \\ \vdots \\ C_n^t \end{pmatrix}$$

where $.^t$ again represents the transposition operator.

At least one of the corrected impulse responses $C'_1$ is used instead of the estimate of the impulse response $C_1$ in the receiver.

The invention offers the option of improving the estimate of the impulse response $C_1, C_2, \ldots, C_n$ of each channel before applying the space-weighted method of estimating a communication path, i.e. before establishing the corrected impulse response(s) $C'_1, C'_2, \ldots, C'_n$.

A time statistic is therefore acquired for at least one of these channels, for example the first channel. The expression "time statistic" refers to a set of data reflecting the behavior of the channel concerned, independently of the other channels and over a predetermined period referred to as the analysis period. It is therefore a representation of the average behavior of the channel during the analysis period. This statistic can be established by any means and anywhere. The statistic can be established in any equipment unit of the radio communication network. What is important is that the receiver is able to acquire this statistic.

A time statistic of this kind can be obtained in the following manner, for example.

Using a method known in the art, an estimate X of the impulse response is calculated from the signal S received during the analysis period.

If the least squares technique is adopted, the value of this estimate X is:

$$X = (A^t A)^{-1} A t. S \quad (1)$$

It must be remembered that the transmitter and receiver are assumed to be synchronized to within better than half a symbol, in which case the received signal is the vector S whose components are the received symbols $s_4$ to $s_{25}$ synchronous with the symbols $a_4$ to $a_{25}$ of the training sequence TS. Several solutions are available for acquiring this synchronization, if not acquired already, and two examples of these will be mentioned.

The first solution consists in advancing or delaying the received signal by i symbol periods so that $s_j^t = (s_{4-j}, s_{5-j}, s_{6-j}, \ldots, s_{25-j})$.

The estimate $X_j$ is then calculated for each vector $S_j$ and the value $j_M$ for which $X_j^h.X_j$ is a maximum is adopted. This value $j_M$ gives the expected synchronization and it is sufficient to replace the vector S in equation (1) with the vector $S_{j_M}$.

The second solution artificially increases the dispersion d of the channel by a predetermined quantity 2q. A modified measurement matrix $A_m$ can then be defined with (n−d−2q) rows and (d+2q+1) columns. Assigning n and d the respective values 26 and 4:

$$A_m = \begin{pmatrix} a_4 + 2_q & \cdots & a_4 & a_3 & a_2 & a_1 & a_0 \\ a_5 + 2_q & \cdots & a_5 & a_4 & a_3 & a_2 & a_1 \\ a_6 + 2_q & \cdots & a_6 & a_5 & a_4 & a_3 & a_2 \\ a_7 + 2_q & \cdots & \cdots & \cdots & \cdots & \cdots & \cdots \\ \cdots & \cdots & \cdots & \cdots & \cdots & \cdots & \cdots \\ \cdots & \cdots & \cdots & \cdots & \cdots & \cdots & \cdots \\ a_{25} & \cdots & \cdots & \cdots & \cdots & \cdots & a_{21} - 2_q \end{pmatrix}$$

It is then necessary to reduce the number of components of the received signal S by the same quantity 2q and by convention the modified vector $S_m$ is retained:

$$S_m^t = (s'_{4+q}, s'_{5+q}, \ldots, s'_{25-q})$$

A modified estimate $X_m$ is therefore obtained:

$$X_m = (A_m^t A_m) A_m^t . S_m$$

The modified estimate $X_m$ has d+2q+1 components:

$$X_m^t = (x_{-q}, \ldots, x_0, x_1, \ldots, x_4, x_{4+q})$$

With the operator $.^*$ representing the complex conjugate, the value $j_M$ of i between −q and +q which maximizes the following expression:

$$\sum_{k=0}^{4} x_{j+k}^* x_{j+k}$$

is then looked for.

The value $j_M$ determines the estimate X of the impulse response for a dispersion d=4:

$$X^t = (x_{jM}, x_{jM+1}, \ldots, x_{jM+4})$$

The synchronization is deduced immediately by applying the offset $j_M$ to the received signal S.

Equation (1) can then be applied again.

A smoothing matrix L is then constructed by smoothing the various estimates X obtained during the analysis period to obtain an estimate of the covariance associated with that impulse response. Here "smoothing" is to be understood in a very general sense, meaning any operation for smoothing or averaging the impulse response over the analysis period. This yields a statistical representation of the behavior of the transmission channel. This smoothing can be achieved by either of the two methods proposed above, the simplest expression of the smoothing matrix L, where m corresponds to the number of training sequences over which the smoothing is calculated, being as follows:

$$L = \frac{1}{m} \sum_{1}^{m} XX^h$$

It is assumed here that the smoothing matrix can be approximated by the following equation:

$$L \approx (A^t A)^{-1} N_0 + R \quad (2)$$

in which $N_0$ again represents the noise present in the communication channel or additive noise and R is a matrix that is usually referred to as the a priori statistical matrix of the channel because it represents the behavior of the channel ignoring noise.

It is also assumed that the measurement matrix A is properly conditioned, i.e. that the eigenvalues of the matrix $A^t A$ are very close to each other. In this case, it is beneficial to normalize the vectors consisting of the measurement matrix A, but this must not be seen as limiting the invention.

For this purpose, a transformation matrix W is used such that:

$$A'=AW \text{ and } A'^t A'=I$$

where I represents the identity matrix.

Letting L' denote the matrix so defined:

$$L=WL'W^t,$$

it is found that equation (2) can now be written:

$$L' \approx N_0 I + R' \quad (3)$$

Figure 2:
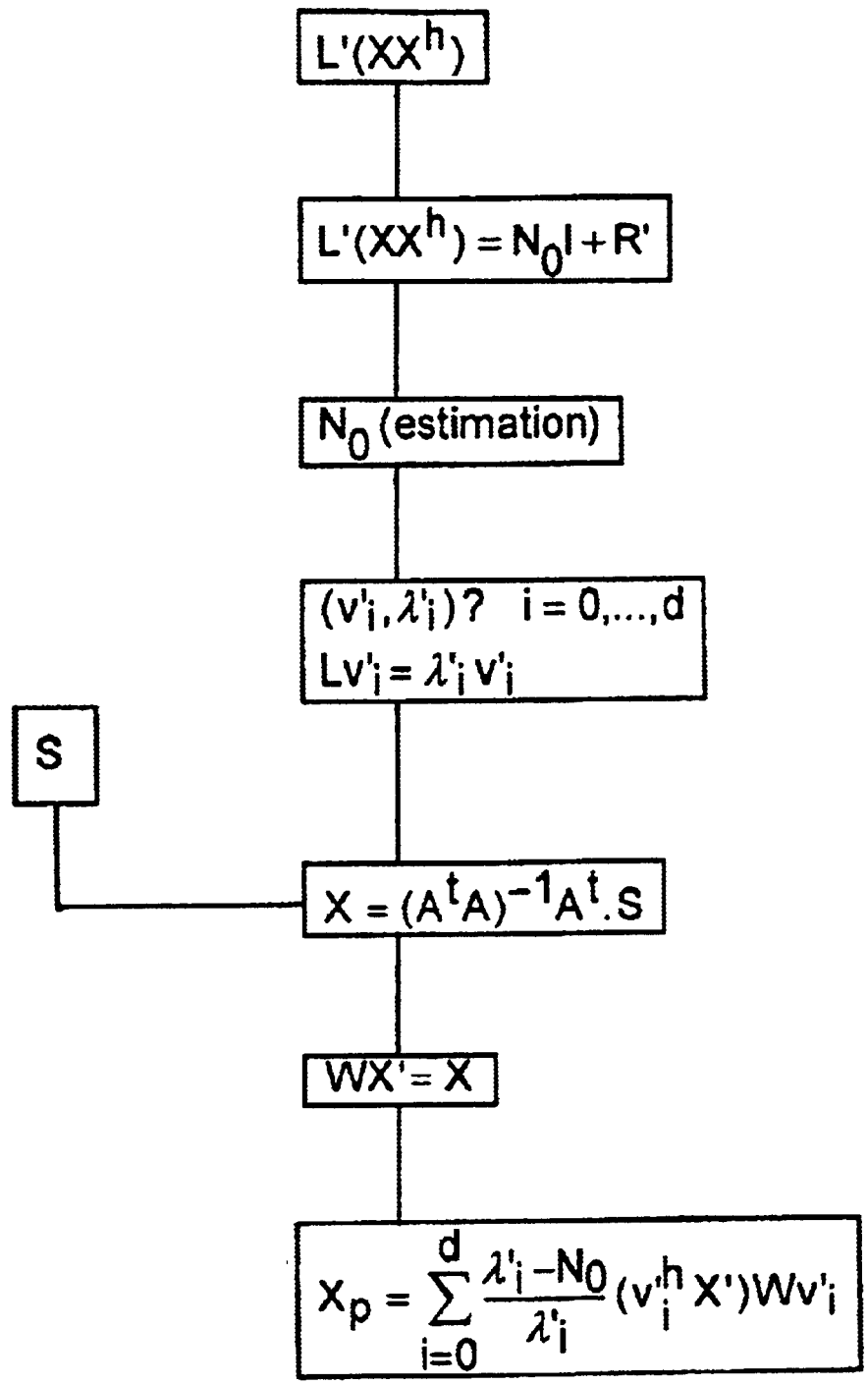
FIG. 2 shows a first variant of a method of the invention for estimating the impulse response of a channel.

Note that in a first variant shown in FIG. 2 the eigenvectors $v_i'$ of L' and $v_i$ of R' are identical whereas the eigenvalues $\lambda_i'$, of L' and $\lambda_i$ of R' are offset by $N_0$. Taking the same value of 4 for the dispersion of the channel, for any i from 0 to 4:

$$V_i' = V_i$$

$$\lambda_i' = \lambda_i + N_0$$

It is therefore apparent that the eigenvectors and eigenvalues of R' and L can be determined in exactly the same way, provided that $N_0$ is known.

The step of estimating the noise will be described later to clarify the explanation, although it precedes the step explained next.

It is therefore now necessary to seek eigenvalue/eigenvector pairs for the matrix L' or R'. This step will not be described in detail because it is well-known to the skilled person. Moreover, it goes without saying that eigenvalues whose contribution is deemed to be insignificant can be eliminated. For example, if the eigenvalues are listed in decreasing order, the lowest values whose sum is below a predetermined threshold can be eliminated.

The next step is to estimate the instantaneous impulse response X from the received signal corresponding to the last training sequence received and using any technique known in the art. Using the notation X=WX', the latter estimate is weighted by the following method to obtain a temporal weighting $X_p$ of the instantaneous impulse response:

$$X_p = \sum_{i=0}^{4} \left( \frac{\lambda_i}{\lambda_i + N_0} (v_i^h X') \right) W v_i \quad X_p = \sum_{i=0}^{4} \left( \frac{\lambda_i' - N_0}{\lambda_i'} (v_i^h X') \right) W v_i$$

To obtain the weighting $X_p$ it is therefore necessary to estimate the additive noise $N_0$.

The noise can be estimated using any of the methods referred to above.

Another possibility is to consider the last (smallest) eigenvalue of the smoothing matrix L as equal to $N_0$:

$$\lambda_4' = N_0 \text{ or } \lambda_4 = 0$$

Whatever method is adopted, the time weighting Xp of the estimate of the instantaneous impulse response can then be obtained as indicated above.

Figure 3:
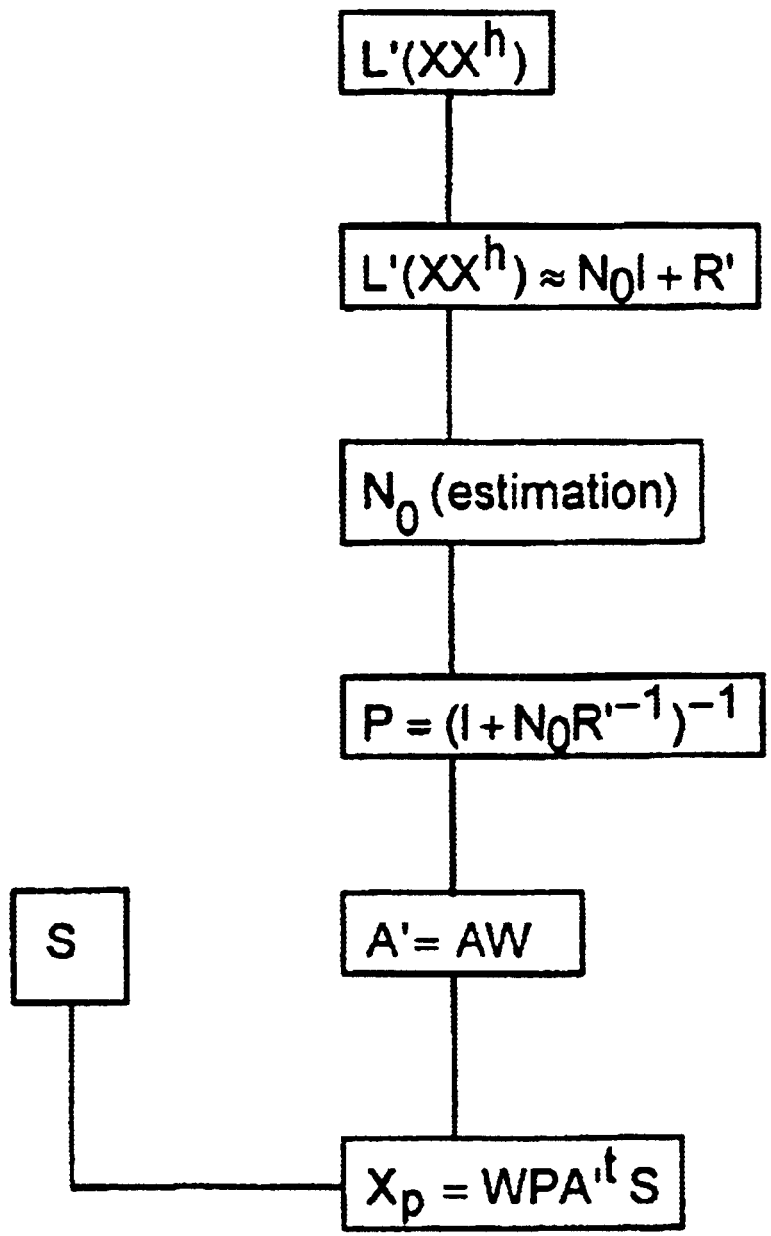
FIG. 3 shows a second variant of a method of the invention for estimating the impulse response of a channel.

In a second variant, shown in FIG. 3, the weighted estimate Xp is established directly as:

$$Xp = (A'^t A + N_0 R^{-1})^{-1} A'^t S$$

Or, using the transformation matrix W defined above:

$$Xp = W(I + N_0 R'^{-1})^{-1} W^t A''.S \quad (4)$$

From equation (3):

$$R' = L' = N_0 I$$

Again the additive noise $N_0$ must be estimated.

An advantageous solution to obtaining the temporal weighting Xp is to use the following method.

The matrix R' is divided by $N_0$:

$$B = \frac{R'}{N_0}$$

It follows that:

$$I + N_0 R'^{-1} = I + B^{-1}$$

The matrix inverting lemma is used to calculate the weighting matrix $P = (I + B^{-1})^{-1}$.

Accordingly, denoting the canonic vectors $e_i$, the following iteration is performed:

initialization: P=B for i varying from 0 to d (4 in this instance):

$$P = P - \frac{Pe_i(Pe_i)^h}{1 + e_i^h Pe_i}$$

Because P is known, all that remains is to establish the weighting Xp from equation (4).

Note that the weighting matrix P is not necessarily calculated as each new training sequence is transmitted. It can be calculated at a slower rate because it varies at substantially the same rate as R' and thus more slowly than the received signal S.

Note also that the weighted estimate is obtained without recourse to the instantaneous impulse response. It is produced directly from the received signal S.

Whichever variant is adopted, it is therefore the weighted estimate Xp that is advantageously used as the estimate of the impulse response $C_1$ to implement the space-weighted method of estimating a communication path, i.e. to produce one or more corrected impulse responses.

What is claimed is:

1. A method of estimating a communication path formed of a plurality of channels, associated with a plurality of antennae, the method necessitating an estimate of the impulse response $C_1, C_2, \ldots, C_n$ of said channels, comprising the steps of:

acquiring a space statistic of the communication path, establishing a corrected impulse response ($C'_1, C'_2, \ldots, C'_n$) at least by weighting said impulse response estimates ($C_1, C_2, \ldots, C_n$) by means of said space statistic and an estimate of the additive noise ($N_{01}, N_{02}, \ldots, N_{0n}$) of said channels.

2. A method according to claim 1, wherein said space statistic corresponds to an estimate of the correlation of said communication channels taken two by two.

3. A method according to claim 2, wherein said estimate of the correlation of the communication channels takes the form of a space correlation matrix (G) in which the element ($g_{ij}$) in the ith row and the jth column is obtained by smoothing the product ($C^h_i C_j$) of the Hermitian transposition of the estimated impulse response ($C_i$) of the ith channel and the estimated impulse response ($C_j$) of the jth channel.

4. A method according to claim 3, wherein if a signal S received by a channel corresponds to a transmitted training sequence the estimate of the additive noise ($N_0$) of that channel is obtained by normalizing the energy of the vector ($S-AC_1$) where A is the measurement matrix associated with said training sequence.

5. A method according to claim 4, wherein said normalization is followed by an averaging step.

6. A method according to any of claims 3 to 5, wherein if a noise matrix (N) is formed from the estimated additive noise ($N_{01}$, $N_{02}$, ..., $N_{0n}$) of the channels and a space-weighting matrix (G') is defined on the basis of said spatial correlation matrix (G) and said noise matrix $G'=G(G+N)^{-1}$, said corrected impulse responses ($C'_1$, $C'_2$, ..., $C'_n$) are obtained from the following expression:

$$\begin{pmatrix} C_1'^t \\ C_2'^t \\ \vdots \\ C_n'^t \end{pmatrix} = G' \begin{pmatrix} C_1^t \\ C_2^t \\ \vdots \\ C_n^t \end{pmatrix}$$

7. A method according to claim 6 wherein, if the signal (S) received by a channel corresponds to a transmitted training sequence, the method includes the following steps before establishing said corrected impulse response ($C'_1$) of that channel:

acquiring a time statistic of the transmission channel, establishing the estimate (Xp) of the impulse response ($C_1$) of said channel, in which the estimate ($X_p$) is weighted by said time statistic of the channel by means of said received signal (S).

8. A method according to claim 7, wherein said time statistic corresponds to an estimate of the covariance of said impulse response.

9. A method according to claim 8, comprising the steps of:

smoothing said impulse response and orthonormalizing by means of a transformation matrix W to obtain said estimate of the covariance which then takes the form of a matrix L', seeking eigenvectors ($v_i'$) and eigenvalues ($\lambda_i'$) associated with that matrix L', estimating an instantaneous impulse response of the channel from said received signal (S) and applying that transformation matrix W to form a vector X', so establishing said weighted estimate (Xp):

$$X_p = \sum \left( \frac{\lambda_i' - N_0}{\lambda_i'} (v_i'^h \cdot X') \right) W v_i'^h$$

where $N_0$ is a positive real number representing the additive noise of said channel.

10. A method according to claim 9, wherein said additive noise ($N_0$) is made equal to the smallest of said eigenvalues ($\lambda_i'$).

11. A method according to claim 9 wherein each eigenvalue of a subset of said eigenvalues ($\lambda_1'$) having a contribution less than a predetermined threshold is forced to the value of said additive noise ($N_0$).

12. A method according to claim 8, wherein said estimate of the covariance takes the form of a matrix R and said weighted estimate (Xp) is established as follows:

$$Xp = (A^t A + N_0 R^{-1})^{-1} A^t \cdot S$$

where A is the measurement matrix associated with said training sequence and $N_0$ is a positive real number representing the additive noise of said channel.

13. A method according to claim 12, comprising a step of orthonormalizing said matrix R by means of a transformation matrix W to obtain a new matrix R', the weighted estimate then taking the following new form:

$$Xp = W^t(I + N_0 R'^{-1})^{-1} W^t A'' \cdot S$$

where the matrix A' is equal to product of the transformation matrix W and said measurement matrix A and I represents the identity matrix.

14. A method according to claim 13, wherein the expression $(I + N_0 R'^{-1})^{-1}$ is calculated by means of the matrix inversion lemma.

* * * * *